Sept. 18, 1962     R. A. KUMMERER ETAL     3,054,301
CHAIN
Filed April 10, 1961

INVENTORS
RICHARD A. KUMMERER
ALFRED DEN BESTEN
BY JOSEPH T. CHESTER.
William A. Murray
ATTORNEY United States Patent Office 3,054,301
Patented Sept. 18, 1962

3,054,301
CHAIN
Richard A. Kummerer, 500 6th Ave., Alfred Den Besten, 1304 8th Ave., and Joseph T. Chester, 1409 9th Ave., all of Fulton, Ill.
Filed Apr. 10, 1961, Ser. No. 101,867
13 Claims. (Cl. 74—250)

This invention relates to a chain and more particularly to a chain link. Also it relates to the method of forming the links of the chain.

In one of the conventional type chain links used in conveyors there is provided a series of links formed of two parallel sides interconnected by transversely extending link pins. It is conventional to provide a bushing of some type completely surrounding the pins. In most operations such a bushing is desirable and consequently it has become standard.

However, in many installations the provision of a bushing completely surrounding the pins creates a very undesirable situation. This is particularly so in agricultural implements such as in the floor conveyors of manure spreaders or forage wagons. In these environments there exists an acidic condition which quickly causes deterioration of metallic parts. It is not uncommon, for example in manure spreaders, to have the pins completely frozen or rusted to the bushings after only a few days of nonuse. In some situations this condition is so serious that the engine of a tractor cannot force pivoting of the links. In many instances the entire chain or parts thereof must be replaced.

It is therefore the main object of the present invention to provide chain link of a new and novel design which has no bushing or bearing for the link pin, but which merely provides a cross piece between the sides of the link in line contact with the link pin so that the pin may bear against it to retain strength in the chain. On opposite sides of the line of contact there will exist divergence between the surface of the cross piece and the surface of the pin.

It is further proposed to provide elongated openings in the link sides receiving the link pins which will permit the pin to move away from the cross piece. Consequently, should a frozen or corroded condition exist between the link pin and cross piece about the line of contact, a striking blow or kick will quickly break the condition.

It is still a further object to form the cross piece into an arcuate shape for contact with the sprocket teeth. Since many conveyors are driven in only one direction or carry load in one direction, the link pins need only be protected from contact with the sprocket teeth on one side. By forming the cross piece arcuately, there is provided a smooth flow of contact between the teeth of the sprocket and the cross piece. In furtherance of this feature, the edges of the cross piece are also rounded. Also, by providing an arcuate cross piece rather than the completely round or circular bushing of previous links, the edges of the cross piece serve to clean the sprocket teeth as they pass over the sprocket.

In the normal chain link in which a bushing is placed around the link pins, the bushings themselves tend to collect the acids in the conveyed material. Consequently, when in nonuse, the acidic effect of the material does its most damage in these bushings. By providing a completely non-enclosed link pin, the collection of the acids about the pins will be minimized and the pivoting action of the pin relative to the remainder of the link will create a self-cleaning action about the pin.

Other objects and advantages of the present invention will become apparent to those skilled in the art as the nature of the invention is better understood from the following disclosure and as shown in the accompanying drawing.

Figure 1:
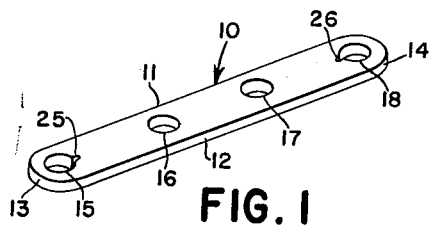
FIGURE 1 is a perspective view showing a metal strap after the first operation of forming it into a chain link.
Figure 2:
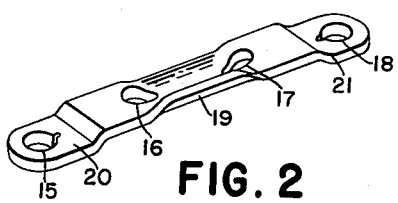
FIGURE 2 is a view similar to FIGURE 1 showing the strap after a further operation of forming.
Figure 3:
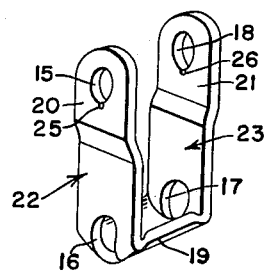
FIGURE 3 is a perspective view showing the completely formed link.
Figure 5:
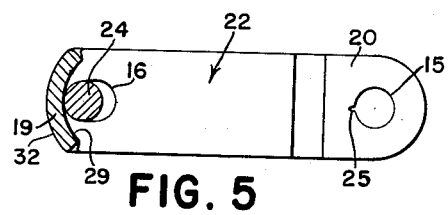
FIGURE 5 is an enlarged sectional view taken substantially along the line 5—5 of FIGURE 4.

Referring now to the drawings, each link of the chain is formed from a single elongated metal strap 10 defined by opposite parallel edges 11, 12 extending to rounded ends 13, 14. The first step in forming the link is to pass it through a die or other typed hole-making medium which cuts four pin receiving holes 15, 16, 17 and 18 and an arcuate central section 19 between the central holes 16, 17. Also the ends 20, 21 are offset or flared in this step. The next step is, as shown in FIGURE 3, bending outer sections 22, 23 at right angles to opposite ends of the central arcuate section 19, thereby giving it a U-shaped appearance.

Figure 4:
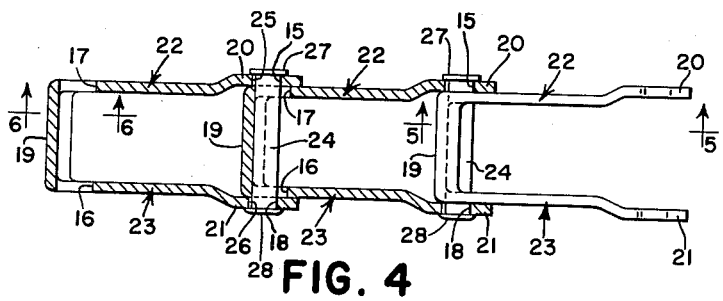
FIGURE 4 is a plan view, partially in section, showing a portion of a chain using the links of the present invention.

Referring now to FIGURE 4, the chain is formed by the bight or arcuate section 19, which extends between the legs or outer sections 22, 23 being placed between the offset ends 20, 21 of the next link. This permits the pin holes 16, 17 of one link to become in registry with holes 15, 18 of the next link. Link pins 24 extend transversely across the links and through the registered holes 15—18. Provided in the holes 15—18 are notches 25, 26. The pins 24 are provided with heads 27 and are swaged at their opposite ends, such as at 28, so that parts thereof extend into the notches to prevent the pins from rotating.

The ends of the arcuate section 19 are contiguous with the edges of the holes 16, 17. In the operation of forming the link the holes 16, 17 are elongated or distorted purposely. This is clearly evident in several of the figures. Consequently the link 24 is relatively free to move in the holes 16, 17 in the longitudinal direction of the legs 23, 24. However, in the preferred form the height of the holes 16, 17 is substantially equal to the diameter of the pins 24. As previously mentioned the additional length of the holes 16, 17 as compared to the size of the pin permits movement of the pin to prevent corroding as well as minimizes the effect of corrosion.

The arcuate or central section 19 is struck about a transverse line or axis spaced considerably from the end of the link. The distance or radius r to the inner surface of the arcuate section 19 is considerably larger than the radius of either the pins 24 or the holes 16, 17. This feature is important since in operation the pins 24 will ride against the inner surface 29 of the arcuate sections 19 but the arcuate sections 19, due to their larger radii, will provide only a line contact with the respective pins. Therefore, the arcuate sections are not journals in any manner. Also, the surface of pin 24 diverges relative to the inner surface 29 and on opposite sides of the line of contact between the pin 24 and inner surface 29.

In the drive in which the present invention is best suited, there is provided a drive sprocket 30 having angularly spaced teeth 31, which for purposes of description will rotate in a clockwise direction. The chain is mounted over the sprocket 30 so that the drive sides of the teeth contact the outer surfaces 32 of the arcuate sections 19.

Figures 6, 7:
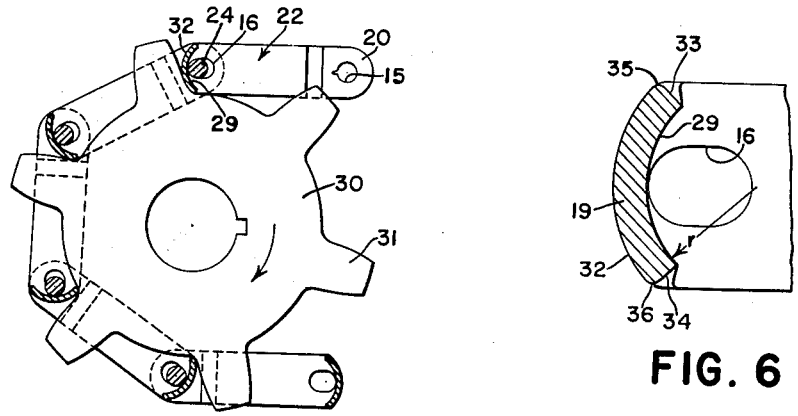
FIGURE 6 is an enlarged sectional view taken along the line 6—6 of FIGURE 4.
FIGURE 7 is a vertical sectional view of the chain passing over a sprocket.

Referring specifically to FIGURE 6, the edges 33, 34 joining the inner and outer surfaces 29, 32 of the arcuate section 29 are rounded at their junctures 35, 36 with the outer surface 32. This feature is important since should the junctures not be rounded there would exist sharp edges on the arcuate sections which would bite into the edges of the teeth 31 as they contact the teeth. This would eventually cause a severe wear point on both the links and the teeth. By rounding the corners there will be a gentle movement of contact between the teeth 32 and sections 19.

While only one form of the invention has been shown, it should be recognized that other forms and variations will occur to those skilled in the art. Therefore, while the present disclosure was shown and described in concise and detailed manner for the purpose of clearly and concisely illustrating the principles of the invention, it should be understood that it was not intended to limit or narow the invention beyond the broad concepts set forth in the appended claims.

What is claimed is:

1. A chain link comprising: a rigid U-shaped member having oppositely disposed and substantially parallel sides opening to one end and closed at the other end by a cross piece having an inner surface facing the open end and an outer surface facing away from the open end and opposite edges joining the surfaces, said cross piece being arcuate shaped and formed about an axis extending between the sides, a pair of alined openings in the respective sides adjacent the cross piece, said openings being slightly elongated longitudinally in respect to the sides, each of said openings having a portion of its edge contiguous with an end of the arcuate shaped cross piece, a pivot pin extending through said openings and normally in contact with the inner surface, the distance between the aforesaid axis and said inner surface being considerably greater than the radius of said pin whereby a line contact will occur between the pin and said inner surface and there will exist divergences between the surface of the pin and the inner surface, said divergences occurring on opposite sides of the line of contact, and said opposite edges having rounded junctures with the outer surface.

2. A chain link comprising: a rigid U-shaped member having oppositely disposed sides opening to one end and closed at the other end by a cross piece having an inner surface facing the open end and an outer surface facing away from the open end and opposite edges joining the surfaces, a pair of alined openings in the respective sides adjacent the cross piece, said openings being slightly elongated longitudinally in respect to the sides, each of said openings having a portion of its edge contiguous with an end of the cross piece, a pivot pin extending through said openings and normally in contact with the inner surface, the shape of said inner surface being such that a line contact will occur between the pin and said inner surface and there will exist divergences between the surface of the pin and the inner surface, said divergences occurring on opposite sides of the line of contact, and said opposite edges having rounded junctures with the outer surface.

3. A chain link comprising: a rigid U-shaped member having oppositely disposed sides opening to one end and closed at the other end by a cross piece having an inner surface facing the open end and an outer surface facing away from the open end and opposite edges joining the surfaces, a pair of alined openings in the respective sides adjacent the cross piece, a pivot pin extending through said openings and normally in contact with the inner surface, the shape of said inner surface being such that a line contact will occur between the pin and said inner surface and there will exist divergences between the surface of the pin and the inner surface, said divergences occurring on opposite sides of the line of contact, and said opposite edges having rounded junctures with the outer surface.

4. A chain link comprising: a rigid U-shaped member having oppositely disposed sides with upper and lower edges and opening to one end and closed at the other end by a cross piece having an inner surface facing the open end and an outer surface facing away from the open end and opposite edges joining the surfaces and the edges of the sides, a pair of alined openings in the respective sides adjacent the cross piece, a pivot pin extending through said openings and normally in contact with the inner surface, the shape of said inner surface being such that a line contact will occur between the pin and said inner surface and there will exist divergences between the surface of the pin and the inner surface, said divergences occurring on opposite sides of the line of contact.

5. The invention defined in claim 4 in which the cross piece is arcuate shaped and formed about an axis at a distance considerably greater than the radius of said pin whereby the cross piece shall be a partial-cylindrical section having an axis eccentric to the axis of the pin.

6. The invention defined in claim 4 in which the openings are elongated to permit the pin to have relatively free movement in the elongated direction of the opening.

7. The invention defined in claim 6 in which the elongated direction is longitudinal as respects the sides and further characterized by the upper and lower dimension of the openings being substantially equal to the similar dimension of the pin.

8. The invention defined in claim 4 further characterized by a second pair of alined openings adjacent said one end, and by the sides at said one end being offset outwardly relative to said cross piece and said other end whereby said one end of one link may be positioned to embrace from opposite sides the other end of another link.

9. The invention defined in claim 4 in which the distance between the upper and lower edges of the sides are substantially equal to the distance between opposite edges of the cross piece.

10. A chain link comprising: a rigid U-shaped member having oppositely disposed and substantially parallel sides opening to one end and closed at the other end by a cross piece being substantially of the same height as said sides and having an inner surface facing the open end and an outer surface facing away from the open end, said cross piece being arcuate shaped and formed about an axis extending between the sides, a pair of alined openings in the respective sides adjacent the cross piece, a pivot pin extending through said openings and normally in contact with the inner surface, the distance between the aforesaid axis and said inner surface being considerably greater than the radius of said pin whereby a line contact will occur between the pin and said inner surface and there will exist divergences between the surface of the pin and the inner surface, said divergences occurring on opposite sides of the line of contact.

11. A chain link comprising: a rigid U-shaped member having oppositely disposed sides opening to one end and closed at the other end by a cross piece having an inner surface facing the open end and an outer surface facing away from the open end and being arcuate shaped and formed about an axis extending between the sides, a pair of alined elongated openings in the respective sides adjacent the cross piece, said openings having spaced substantially semi-circular ends, a pivot pin extending through and loosely retained for longitudinal movement within said openings and normally in contact with the inner surface, the inner surface being shaped so a line contact will occur between the pin and said inner surface and there will exist divergences between the surface of the pin and the inner surface, said divergences occurring on opposite sides of the line of contact.

12. A method of forming a chain link from an elongated metal strap having opposite elongated parallel edges extending between ends of the strap, comprising: cutting four holes in the strap placed at opposite ends and on opposite sides of a central portion; forming the central portion arcuately about an axis substantially parallel to the plane of the strap; and at a distance from the strap greater than the radius of the holes; bending the strap into a U-shape member with the central portion extending across one end, the holes adjacent the central portion and the holes adjacent the ends being alined across the member to receive pivot pins; and rounding the point of juncture between the edges of the central portion and arcuate surface of the central portion facing away from the holes.

13. A method of forming a chain link from an elongated metal strap having opposite elongated parallel edges extending between ends of the strap, comprising: cutting four holes in the strap placed at opposite ends and on opposite sides of a central portion; forming the central portion arcuately about an axis substantially parallel to the plane of the strap; and at a distance from the strap greater than the radius of the holes; and bending the strap into a U-shape member with the central portion extending across one end, the holes adjacent the central portion and the holes adjacent the ends being alined across the member to receive pivot pins.

References Cited in the file of this patent

UNITED STATES PATENTS

| | | |
|---|---|---|
| 552,899 | Dunlop et al. | Jan. 14, 1896 |
| 2,272,837 | Getz et al. | Feb. 10, 1942 |
| 2,793,536 | Onulak | May 27, 1957 |

FOREIGN PATENTS

| | | |
|---|---|---|
| 632,881 | France | Oct. 17, 1927 |